A. J. DE VOE.
WEATHER INDICATOR.
APPLICATION FILED JULY 16, 1917.
1,312,961. Patented Aug. 12, 1919.
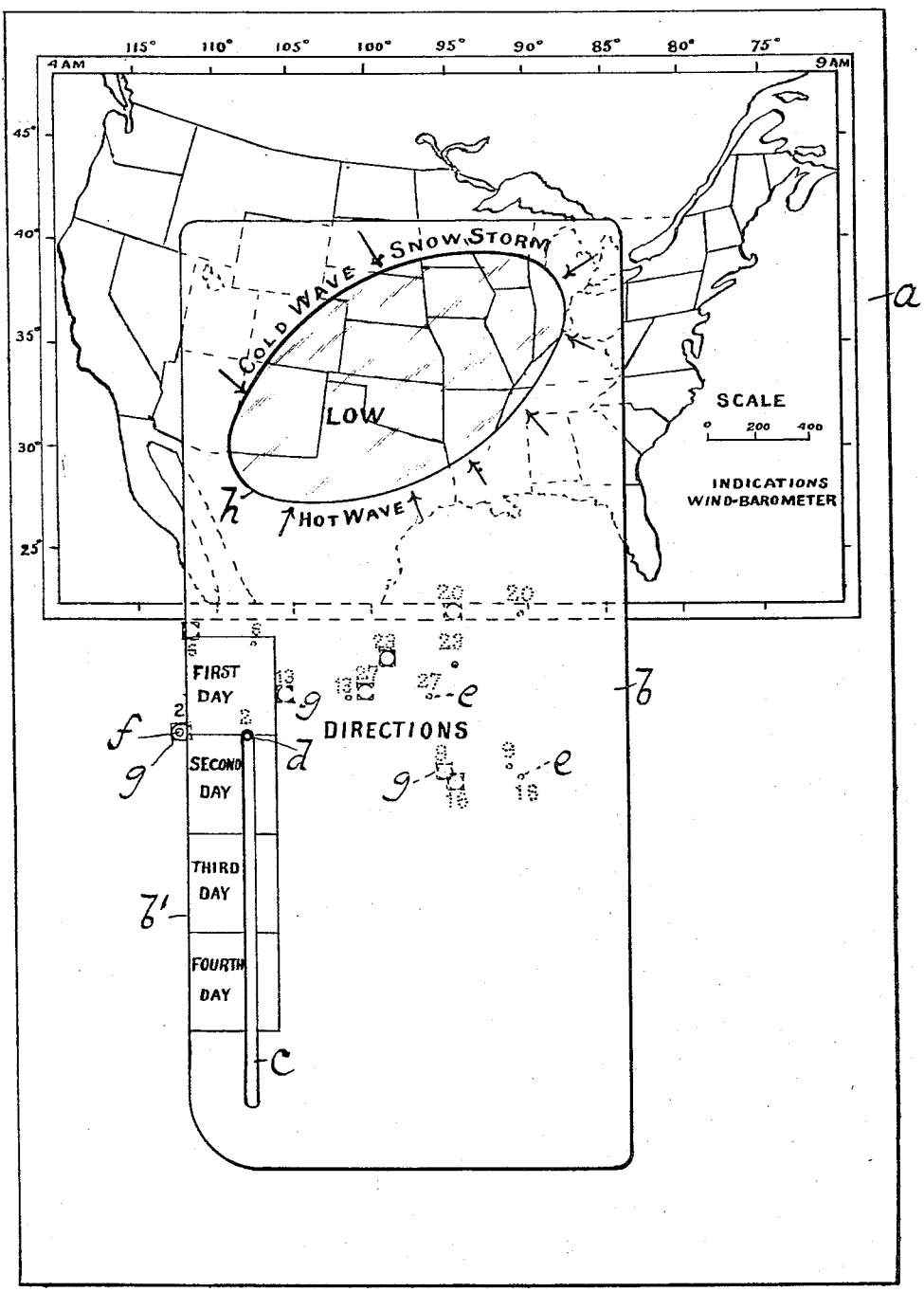
INVENTOR
Andrew J. De Voe
BY
Hauff & Barland.
ATTORNEYS

UNITED STATES PATENT OFFICE.

ANDREW J. DE VOE, OF HACKENSACK, NEW JERSEY.

WEATHER-INDICATOR.

1,312,961.  Specification of Letters Patent.  Patented Aug. 12, 1919.

Application filed July 16, 1917. Serial No. 180,797.

*To all whom it may concern:*

Be it known that I, ANDREW J. DE VOE, a citizen of the United States, residing at Hackensack, county of Bergen, and State of New Jersey, have invented new and useful Improvements in Weather-Indicators, of which the following is a specification.

This invention relates to a weather indicator in which the area of a storm is designated on a chart, by means of an indicator card movably mounted on the chart.

The invention is designed to provide the chart with printed matter representing a number of days in each month, and means attached to a predetermined day for controlling the position of the indicator card relative to the chart and the direction in which the storm travels.

The indicator card is provided with means denoting the usual duration a storm takes in passing over a given area, so that the card can be shifted or oscillated to indicate, over a large territory, the positions of the storm during the whole of the storm period.

The invention resides in the novel combinations hereinafter described and claimed and illustrated in the accompanying drawing in which:

The figure represents a plan view of an indicator embodying this invention.

In the drawing the letter $a$ designates a chart which is preferably of the plane surface type, and is shown provided with a map of the United States for the purpose of illustrating the invention. This map has printed matter thereon representing the degrees of longitude and latitude, also the scale of statute miles, the direction of the wind and the barometer indication.

The lower portion of this chart is provided with numerals such as 2, 6, 9, 13, 16, 20, 23, and 27 representing two days in each week for a designated month in the year 1917. It will be understood, that the chart could have any number of printed days thereon in various formations to embrace more or less than a month.

An indicator card or arm $b$ is arranged on the chart and adapted to coact with devices hereinafter described attached to one or the other of the days. The card $b$ is provided with a vertically disposed slot $c$ made to slide along a pin $d$ stuck into a dot $e$ showing the day of the month. Another pin $f$ is placed into a square $g$ and made to engage the edge $b'$ of the card. The indicator card is preferably made of stiff card-board and it has a sight opening $h$ covered with transparent material such as mica or celluloid. The opening is practically elliptic, and the arrows along the perimeter thereof indicate the direction in which the wind should blow in a given area to denote a cold wave, snow storm, and hot wave. The elliptic opening approximately covers an area on the map of about 90,000 square miles. The indicator card has printed matter thereon, such as first, second, third and fourth day, denoting the period it usually takes for a storm to pass over a given area. It also may have the directions printed thereon for operating the indicator card. These directions are as follows, and are given for the month of June.

It usually requires from three to four days for a storm to pass over the United States, from the day that it first appears. This device is constructed to show a storm period of four days, but a storm does not always hang over the United States for four days. At times it only continues two days within the limits of the United States. Therefore, for convenience sake, I have selected Saturdays and Wednesdays as the most interesting days on which to set the storm indicator and by looking through the sight opening where it is marked low (which means storm center) it can be seen at a glance over what part of the United States that storm is passing, and the arrows around the edge of the opening show the direction in which the wind is blowing both before and after the storm has passed. For example to ascertain what the weather will be on any particular day select a Wednesday or Saturday of any week and move the storm indicator as directed. Take for example Saturday June 2nd. Place a pin $d$ over the dot marked 2 also a pin $f$ in the square of the same date, then place the slot $c$ in the storm indicator over the pin $d$ on the dot marked 2. Draw the indicator southward or downward till the pin strikes the upper end of the slot as shown in the drawing. Then swing the storm center westward until the western edge $b'$ of the storm indicator strikes the pin $f$ over the square of the same date. That will give the position of the storm center on the morning of June 2nd. Then swing the storm center eastward till the western edge $b'$ of the storm indicator strikes the same pin from the southeast. Then move the storm indicator upward keeping the western edge of the storm center against the pin $f$ till the latter pin passes around the curve at the bottom of the indicator. That storm period is divided into four days as will be seen on the western edge $b'$ of the storm indicator. The pin $f$ limits the movement of the indicator in relation to the map so that when the indicator is slid up or down within the limits of the slot $c$ it can be oscillated with the pin $d$ as a fulcrum and the pin $f$ as a stop.

It will be readily understood, that the locations of the series of squares and dots on the chart in their positions relative to the map, may be varied for any of the other months in a year, depending on the weather prediction for that year. As indicated in the drawing, each pair of the series designating a day are somewhat out of line with each other to control the oscillation of the indicator arm.

Modifications of the device may be made within the law of equivalents and the scope of the claims, for example; the indicator arm could be made of celluloid, with a line of demarcation printed thereon to represent the area included in the sight opening.

Now what I claim is:—

1. In a weather indicator the combination with a chart, of means representing a predetermined time, and means mounted on the chart and controlled by the time representing means for showing the area of a storm.

2. In a weather indicator the combination with a chart, of means representing a predetermined time, and means swingingly mounted on the chart and controlled by the time representing means for showing the area of a storm.

3. In a weather indicator the combination with a chart, of means representing a predetermined time, a slotted card slidingly and swingingly mounted on the chart and controlled by the time representing means for showing the area and path of a storm.

4. In a weather indicator the combination with a plane chart, of means representing a predetermined period of time, a slotted card slidingly and swingingly mounted on the chart and controlled by the time representing means, and a sight opening in the card for showing the area of a storm.

5. In a weather indicator the combination with a plane chart having means thereon representing a number of days in a month, of a slotted card slidingly mounted on the chart the movement of which is controlled by the means, and a sight opening in the card for showing the area and path of a storm.

6. In a weather indicator the combination with a plane chart having inscriptions thereon representing a number of days in a month, of a slotted card slidingly positioned on the chart, means corresponding to a predetermined day for controlling the movement of the card relative to the chart, and a sight opening in the card for exposing an area on the plane chart.

7. In a weather indicator the combination with a plane chart having a series of pairs of numerals thereon representing the days in a month, of a pair of pins engaging a pair of numerals, a card having a slot to slidingly mount it on one of the pins, and an edge to coöperate with the other pin, and a sight opening in the card for exposing an area on the chart.

In testimony whereof I have hereunto set my hand in the presence of two subscribing witnesses.

ANDREW J. DE VOE.

Witnesses:
WILLIAM MILLER,
JOHN A. BERGSTROM.